United States Patent
Jiang et al.

(10) Patent No.: US 7,920,358 B2
(45) Date of Patent: Apr. 5, 2011

(54) PERPENDICULAR MAGNETIC RECORDING WRITE HEAD WITH MAGNETIC SHIELDS SEPARATED BY NONMAGNETIC LAYERS

(75) Inventors: Ming Jiang, San Jose, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 788 days.

(21) Appl. No.: 11/952,019

(22) Filed: Dec. 6, 2007

(65) Prior Publication Data

US 2009/0147410 A1 Jun. 11, 2009

(51) Int. Cl.
*G11B 5/147* (2006.01)

(52) U.S. Cl. ............ 360/125.17; 360/125.3; 360/125.06

(58) Field of Classification Search ............. 360/125.17, 360/125.3, 125.06, 125.08, 125.26, 123.05
See application file for complete search history.

(56) References Cited

U.S. PATENT DOCUMENTS

| | | | |
|---|---|---|---|
| 6,884,148 B1 | 4/2005 | Dovek et al. | |
| 7,002,775 B2 | 2/2006 | Hsu et al. | |
| 7,140,095 B2 | 11/2006 | Matono et al. | |
| 2005/0128637 A1* | 6/2005 | Johnston et al. | 360/125 |
| 2005/0259356 A1 | 11/2005 | Han et al. | |
| 2006/0044681 A1 | 3/2006 | Le et al. | |
| 2006/0082924 A1 | 4/2006 | Etoh et al. | |
| 2006/0092564 A1 | 5/2006 | Le et al. | |
| 2007/0115584 A1 | 5/2007 | Balamane et al. | |
| 2007/0211384 A1 | 9/2007 | Hsiao et al. | |
| 2007/0247746 A1 | 10/2007 | Kim et al. | |
| 2008/0170334 A1* | 7/2008 | Otagiri | 360/313 |
| 2008/0259498 A1* | 10/2008 | Lengsfield et al. | 360/235.4 |
| 2009/0122445 A1* | 5/2009 | Jiang et al. | 360/123.12 |
| 2009/0154019 A1* | 6/2009 | Hsiao et al. | 360/234.3 |
| 2009/0168240 A1* | 7/2009 | Hsiao et al. | 360/125.02 |
| 2009/0251827 A9* | 10/2009 | Pokhil et al. | 360/317 |

* cited by examiner

*Primary Examiner* — Jefferson Evans
(74) *Attorney, Agent, or Firm* — Thomas R. Berthold

(57) ABSTRACT

A perpendicular magnetic recording write head that may be used in magnetic recording disk drives has a magnetic write pole (WP) with an end that is generally the same width as the width of the data tracks on the disk. A trailing shield (TS) is spaced from the WP in the along-the-track direction, a pair of side shields are located on opposite sides of the WP in the cross-track direction, and an optional leading shield (LS) is located on the opposite side of the WP from the TS in the along-the-track direction. The TS, side shields and LS are formed of magnetically permeable soft ferromagnetic material and are separated from each other by nonmagnetic separation layers. The TS, side shields and LS each has a throat height (TH) thickness in its region facing the WP. The throat heights for the shields may be different.

16 Claims, 10 Drawing Sheets

PERPENDICULAR MAGNETIC RECORDING WRITE HEAD WITH MAGNETIC SHIELDS SEPARATED BY NONMAGNETIC LAYERS

BACKGROUND OF THE INVENTION

1. Field of the Invention

This invention relates generally to perpendicular magnetic recording write heads for use in magnetic recording disk drives, and more particularly to a write head with separated trailing, side and leading shields.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording or write head in perpendicular magnetic recording disk drives includes a write pole for directing a magnetic field to data tracks in the recording layer, and one or more return poles for return of magnetic flux from the recording layer.

The write head may also include a trailing shield (TS) of magnetically permeable material that faces the recording layer and is spaced from the write pole in the along-the-track direction by a nonmagnetic gap. The TS slightly alters the angle of the write field and makes writing more efficient.

The write head also typically includes a pair of side shields located on opposite sides of the write pole in the cross-track direction and separated from the write pole by a nonmagnetic gap layer. The side shields control the write width and eliminate adjacent-track-erasure. Typically the TS and side shields are connected or formed as a single-piece structure to form a wraparound shield (WAS) that generally surrounds the write pole. The WAS results in the TS and the side shields being formed of the same material and material composition and having the same throat height. A perpendicular magnetic recording write head with a WAS is described in U.S. Pat. No. 7,002,775 B2, assigned to the same assignee as this application.

What is needed is a perpendicular magnetic recording write head that has a trailing shield and side shields that are magnetically separated so that they can be formed of different materials or material compositions and can have different throat heights, to thereby independently control their magnetic properties to optimize performance of the write head.

SUMMARY OF THE INVENTION

The invention is a perpendicular magnetic recording write head that may be used in magnetic recording disk drives. In a disk drive implementation the write head is formed on the trailing surface of a head carrier or slider that has an air-bearing surface (ABS) oriented generally perpendicular to its trailing surface and generally parallel to the surface of the disk during operation of the disk drive. The write head has a magnetic write pole (WP) and first and second flux return poles. The WP is located on the trailing surface of the slider and has a WP end at the ABS that has a width in the cross-track direction that is generally the same as the width of the data tracks on the disk.

The write head includes a set of shields of magnetically permeable material surrounding the WP end near the ABS. A trailing shield (TS) is spaced from the WP in the along-the-track direction and separated from the WP by a nonmagnetic gap layer. The TS improves the down-track write field gradient for better writing. The TS may be connected to one of the flux return poles. A pair of side shields are located on opposite sides of the WP in the cross-track direction and separated from the WP by a nonmagnetic gap layer. The side shields control the write width and eliminate adjacent-track erasure. The write head may also include a leading shield (LS) located on the opposite side of the WP from the TS in the along-the-track direction and separated from the WP by a nonmagnetic gap layer. The LS reduces the fringing field at the leading edge of the WP and controls erasure width at the skew angle. The LS may be connected to the other flux return pole.

The TS, side shields and LS are magnetically separated from each other by nonmagnetic separation layers. The separation layers enable the TS, side shields and LS to be formed of different materials or different compositions of the same alloy, so that the magnetic permeability, and thus the magnetic flux density (magnetic field), through each of the shields can be independently controlled. This enables the magnetic field from the WP to be tailored to provide the desired magnetic field gradient.

Each of the TS, side shields and LS has a thickness in its region facing the WP, so as to define the shield's throat height (TH). The throat heights for the shields may be different, which allows for the TS, side shields and LS to be independently designed to optimize write performance.

For a fuller understanding of the nature and advantages of the present invention, reference should be made to the following detailed description taken together with the accompanying figures.

DETAILED DESCRIPTION OF THE INVENTION

Figure 1A:
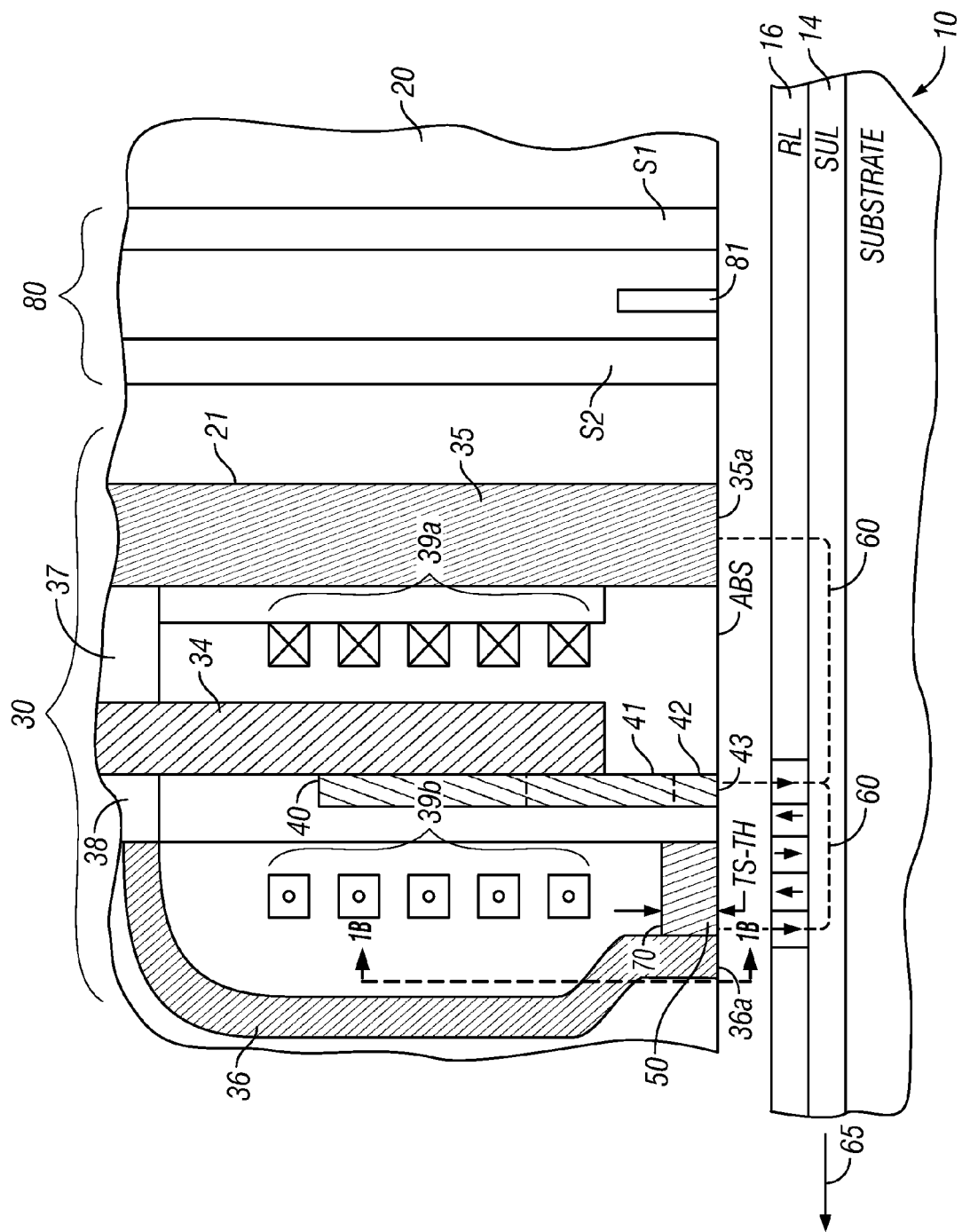
FIG. 1A is a side sectional view of a prior art perpendicular magnetic recording system showing a read head, a write head, and a recording medium through a central plane that intersects a data track on the medium.

FIG. 1A is a side sectional view of a prior art perpendicular magnetic recording write head, read head and a recording medium taken through a central plane that intersects a data track on the medium. As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a single write pole type of recording or write head 30. The recording head 30 includes a yoke made up of the main pole 34, first flux return pole 35, second flux return pole 36 and yoke studs 37, 38 connecting the main pole and return poles 35, 36 respectively; and a thin film coil 39a, 39b shown in section around main pole 34. A flared write pole (WP) 40 is part of the main pole 34 and has a flared portion 41 and a pole tip 42 with an end 43 that faces the outer surface of medium 10. Write current through coil 39a, 39b induces a magnetic field (shown by dashed line 60) from the WP 40 that passes through the RL 16 (to magnetize the region of the RL 16 beneath the WP 40), through the flux return path provided by the SUL 14, and back to the ends 35a, 36a of return poles 35, 36, respectively. The recording head is typically formed on a trailing surface 21 of an air-bearing slider 20 that has its air-bearing surface (ABS) supported above the surface of medium 10.

A magnetoresistive (MR) read head 80 comprised of a MR sensing element 81 located between MR shields S1 and S2 is also deposited on the trailing end of the slider 20 prior to the deposition of the layers making up the write head 30. As depicted in FIG. 1A, trailing surface 21 may be a nonmagnetic layer deposited on the MR shield S2. In FIG. 1A, the medium 10 moves past the recording head 30 in the direction indicated by arrow 65, so the portion of slider 20 that supports the MR head 80 and write head 30 is often called the slider "trailing" end, and the surface perpendicular to the slider ABS on which the write head 30 is located is often called the "trailing" surface.

The RL 16 is illustrated with perpendicularly recorded or magnetized regions, with adjacent regions having opposite magnetization directions, as represented by the arrows. The magnetic transitions between adjacent oppositely-directed magnetized regions are detectable by the MR sensing element 81 as the recorded bits.

FIG. 1A also illustrates a trailing shield (TS) 50 separated from WP 40 by a nonmagnetic gap layer 56. The TS 50 has a throat height (TH) defined generally as the distance between the ABS and a back edge 70. The TS 50 is magnetically permeable material formed of soft (low coercivity) ferromagnetic material. The TS 50, which is separated from the WP 40 by nonmagnetic gap 56, slightly alters the angle of the write field and makes writing more efficient.

Figure 1B:
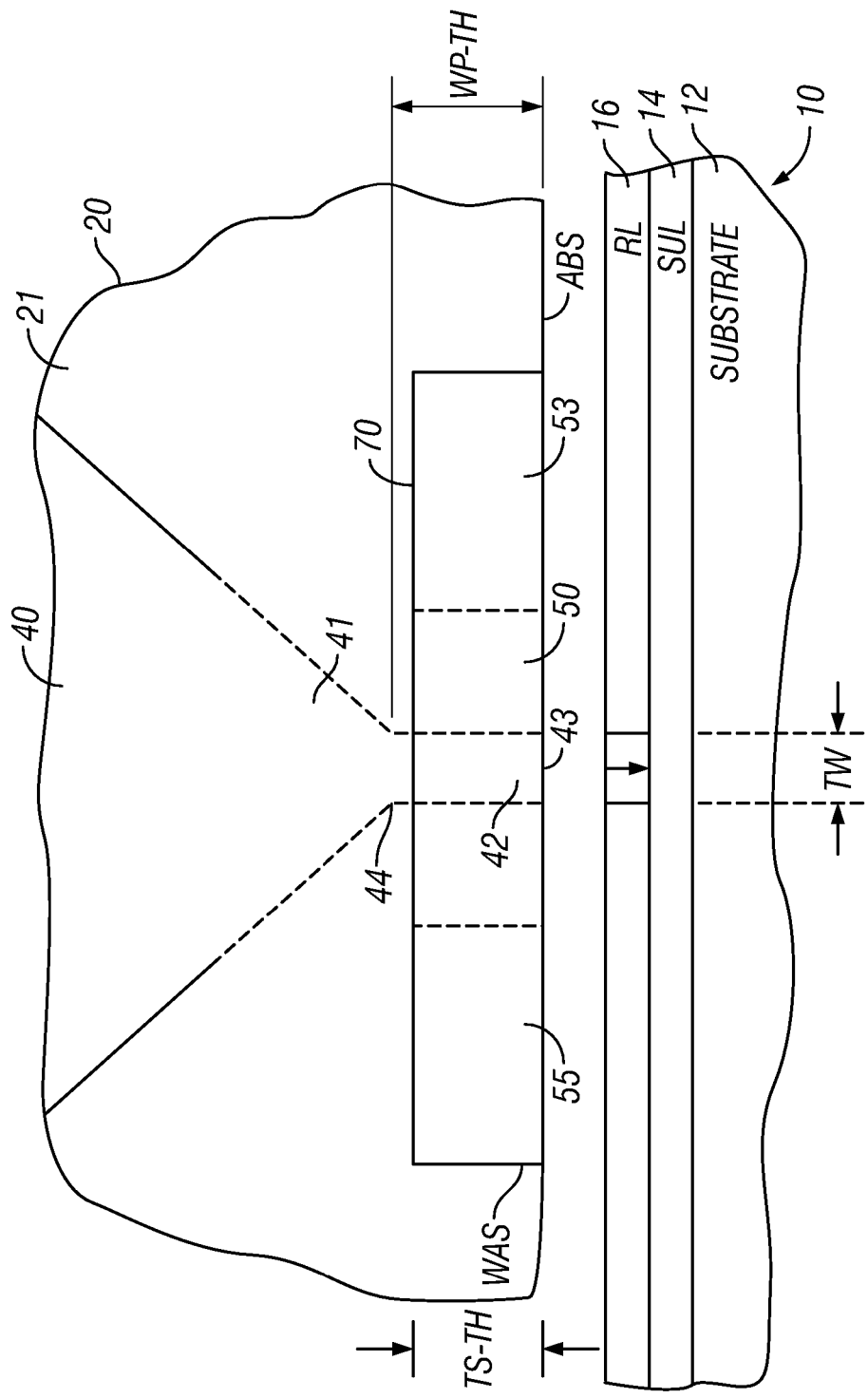
FIG. 1B is a view in the direction 1B-1B of FIG. 1A and shows the write pole (WP) and the wraparound shield (WAS) that includes the trailing shield (TS) with a TS throat height (TS-TH) in the prior art write head of FIG. 1A.

FIG. 1B is a view in the direction 1B-1B of FIG. 1A to illustrate the WP 40 and the TS 50 on trailing surface 21 of slider 20. To simplify the illustration of FIG. 1B, neither the gap layer 56 nor the layers between WP 40 and the surface 21, shown in FIG. 1A, are shown in FIG. 1B. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a throat height (TH) which is generally the distance from end 43 to flare point 44. As shown in FIG. 1B, the two side walls of WP tip 42 define its width in the cross-track direction, which substantially defines the trackwidth (TW) of the data recorded in the RL 16. The region of the WP 40 above the flare region 41 is substantially wider than WP tip 42 below the flare region 41 and the flare point 44 is recessed from the ABS and is the transition point where the WP 40 begins to widen with distance from the ABS. The flare angle between flare region 41 and WP 42 is between 90 and 180 degrees, typically between about 120 and 150 degrees.

FIG. 1B also illustrates the TS 50. The portions identified as 53, 55 on opposite ends of TS 50 are side shields which, together with TS 50, form a wraparound shield (WAS) that generally surrounds the WP tip 42. The TH for the TS 50 is the distance from the ABS to the back edge 70. This is also the throat height (SS-TH) for the side shields 53, 55.

Figure 1C:
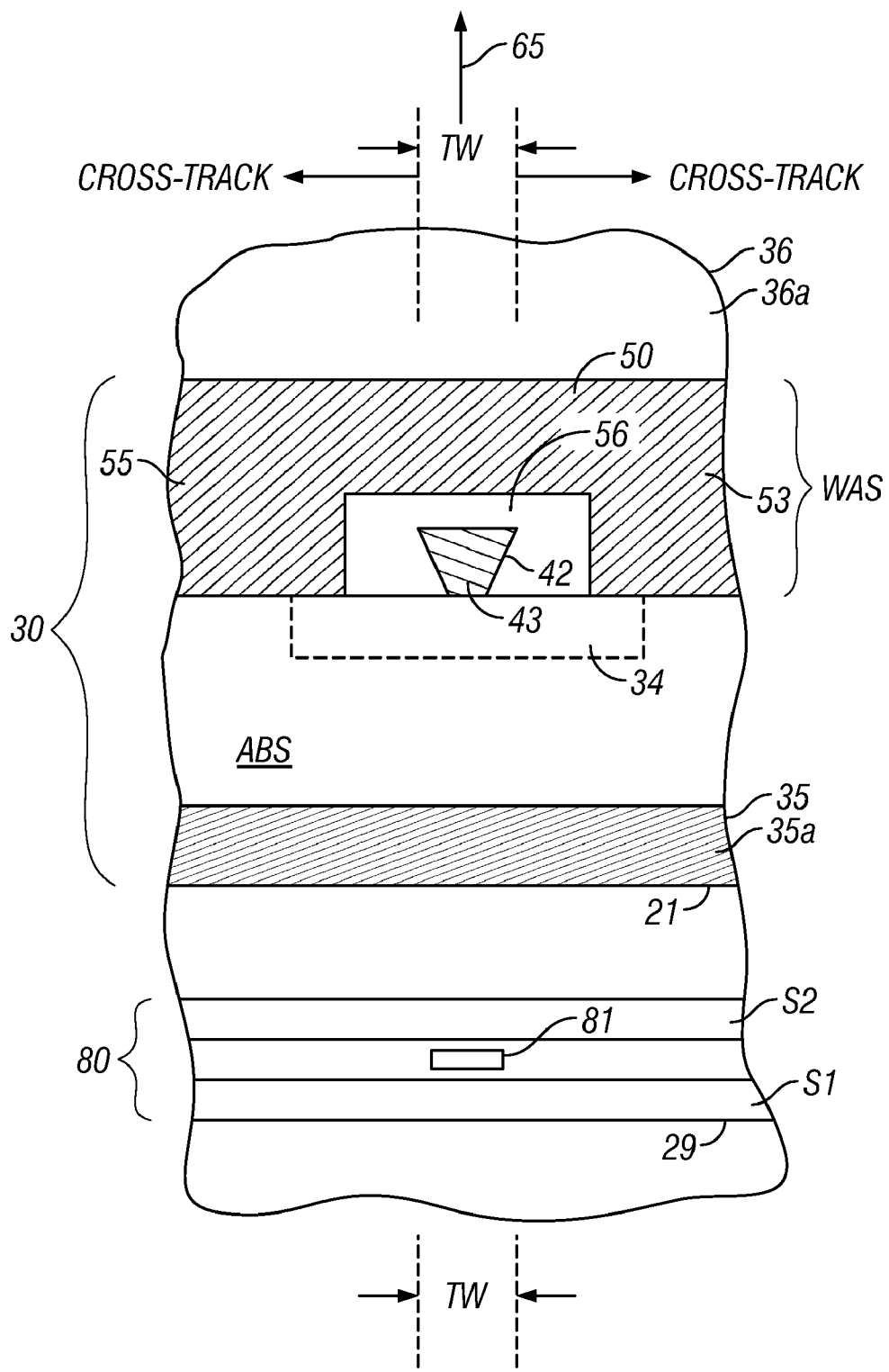
FIG. 1C is a view from the air-bearing surface (ABS) of the prior art write head and read head in FIG. 1A and shows the WAS.

FIG. 1C illustrates the write head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider 20 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The recording medium 10 moves relative to the head 30 in the direction 65, which is called the along-the-track direction. The direction perpendicular to direction 65 and parallel to the plane of the ABS is called the cross-track direction. The width of the end 43 of WP tip 42 in the cross-track direction substantially defines the track-width (TW) of the data tracks in the RL 16. The main pole 34 is shown with dashed lines because it is recessed from the ABS (see FIG. 1A).

The WAS that includes side shields 53, 55 and TS 50 is described in detail as a shield for a conventional perpendicular recording head in U.S. Pat. No. 7,002,775 B2, assigned to the same assignee as this application. The shields 50, 53, 55 all have ends substantially at the recording-layer-facing surface. The shields 50, 53, 55 are formed as a single-piece structure to form the WAS that substantially surrounds the WP tip 42 and are thus formed of the same material, typically a NiFe, CoFe or NiFeCo alloy, so that they have the same alloy composition. The TS 50 and side shields 53, 55 are separated from WP tip 42 by nonmagnetic gap material, typically alumina, which forms the gap layer 56. The WAS, which is separated from the WP tip 42 by gap layer 56, alters the angle of the write field and improves the write field gradient at the point of writing, and also shields the writing field at regions of the medium 10 away from the track being written. The WAS is shown as connected to the return pole 36. However, the WAS may be a "floating" shield not connected to either the return pole 36 or other portions of the yoke by flux-conducting material.

FIG. 1C also illustrates the magnetoresistive (MR) read head 80 that includes the MR sensor 81 located between MR shields S1, S2. The films making up MR head 80 and write head 30 as shown in FIG. 1C are formed in succession on the trailing end of air-bearing slider 20, by a series of thin film deposition, etching and lithographic patterning processes. As shown in FIG. 1C, the films making up (MR) read head 80 are formed on substrate surface 29 and the films making up write head 30 are formed on substrate surface 21, which is typically a layer of nonmagnetic material, like alumina, that separates write head 30 from read head 80.

The yoke and shields of write head 30 are formed of soft ferromagnetic material, such as alloys of NiFe, CoFe and NiFeCo that are typically formed by electroplating. The WP 40 is formed of a high-moment material, such as a high-moment CoFe alloy, that is typically formed by sputter deposition, and may be a laminated structure.

Figure 2A:
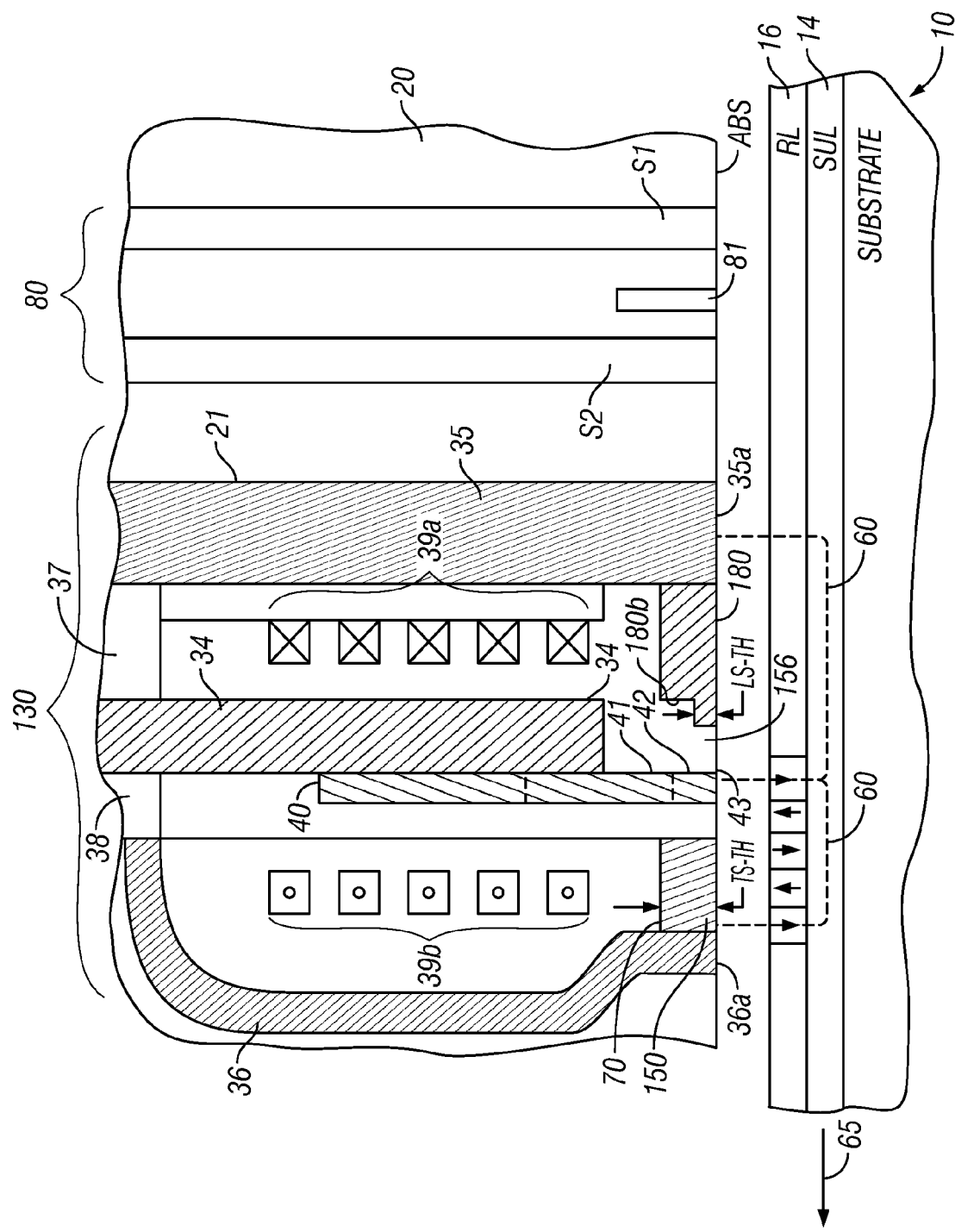
FIG. 2A is a side sectional view of a perpendicular magnetic recording system showing a read head, the write head according to this invention, and a recording medium through a central plane that intersects a data track on the medium.
Figure 2B:
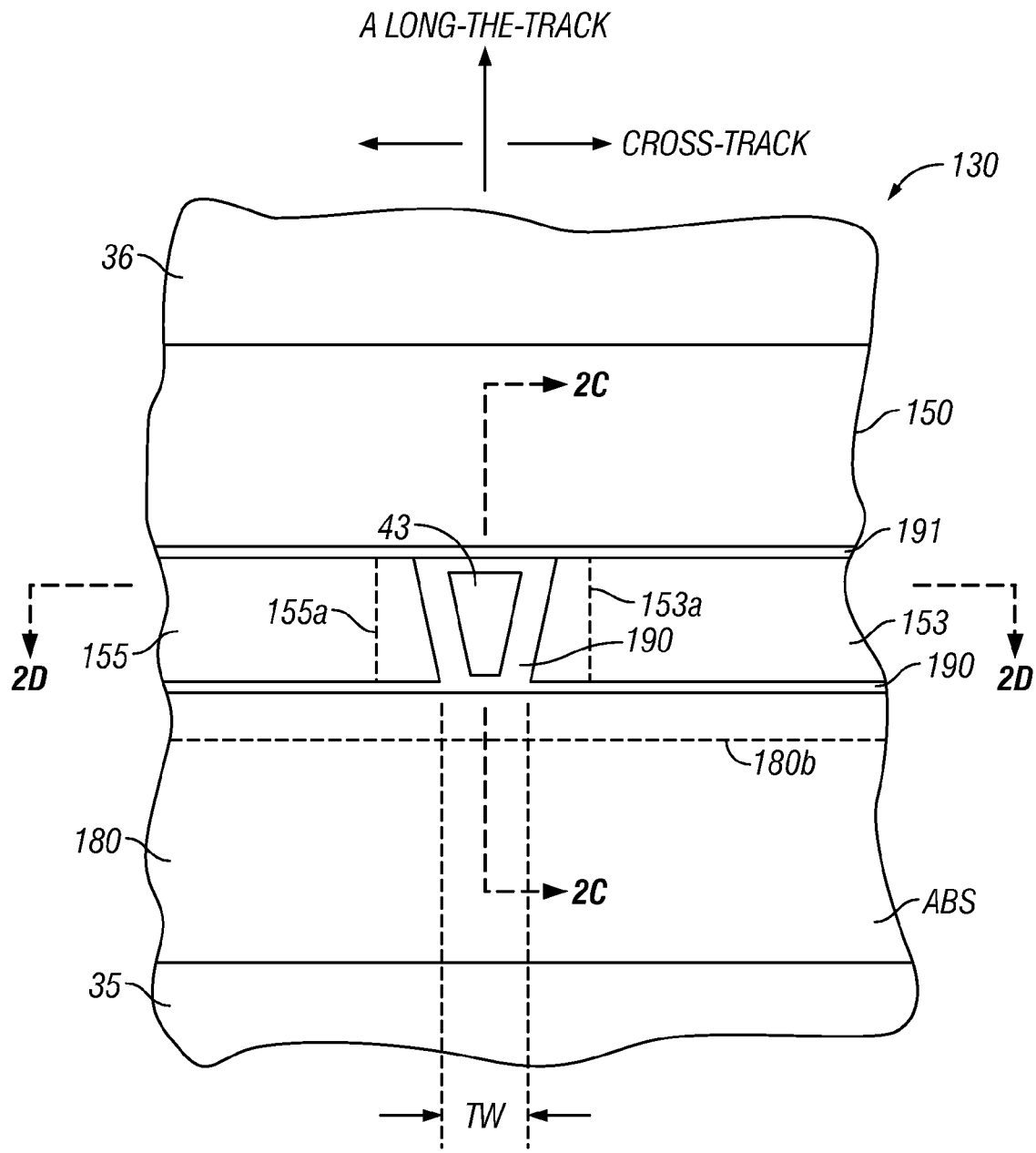
FIG. 2B is a view from the ABS of the write head of this invention and shows the separate leading shield (LS), trailing shield (TS), and side shields.

FIG. 2A is a side sectional view of the perpendicular magnetic recording write head 130 according to this invention, the read head 80 and the recording medium 10 taken through a central plane that intersects a data track on the medium. FIG. 2B is a view from the ABS of the write head of FIG. 2A. The write head includes the WP 40, a TS 150, and a nonmagnetic gap layer 156 between WP 40 and TS 150. The TS 150 is shown as being connected to flux return pole 36.

As shown in FIG. 2A, the write head 130 also includes a leading shield (LS) 180 with a step and surface 180b that faces WP 40. The portion of LS 180 that faces the WP 40 has a TH (LS-TH) that is less than the portion of LS 180 farther from WP 40. The LS 180 is shown as being connected to flux return pole 35. As shown in FIG. 2B, the write head 130 also includes side shields 153, 155 spaced on opposite sides of WP end 43. The side shields 153, 155 may also have steps to create a reduced side shield TH (SS-TH), as shown by dashed lines 153a, 155a, respectively. Each of TS-TH, LS-TH and SS-TH may be different values, which enables the flux to be independently controlled to each of the shields.

Figure 2C:
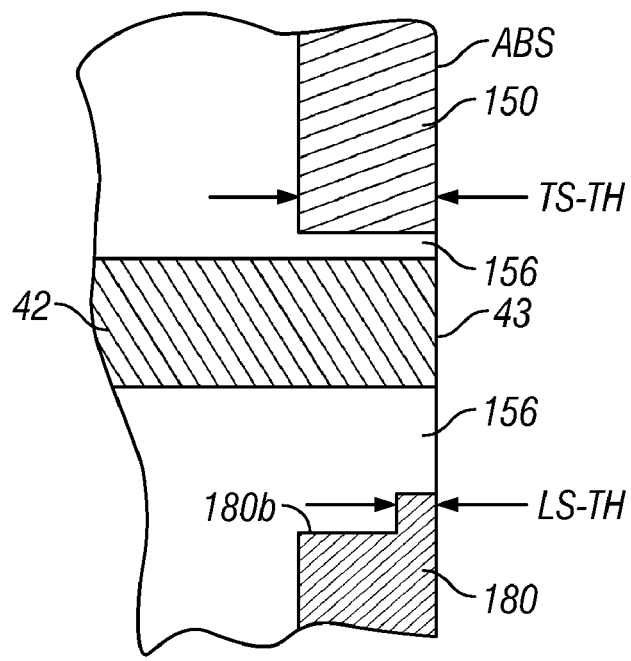
FIGS. 2C and 2D are views of sectional planes through sections 2C-2C and 2D-2D, respectively, of FIG. 2B and illustrate the write pole tip and the LS, TS and side shields at the ABS.
Figure 2D:
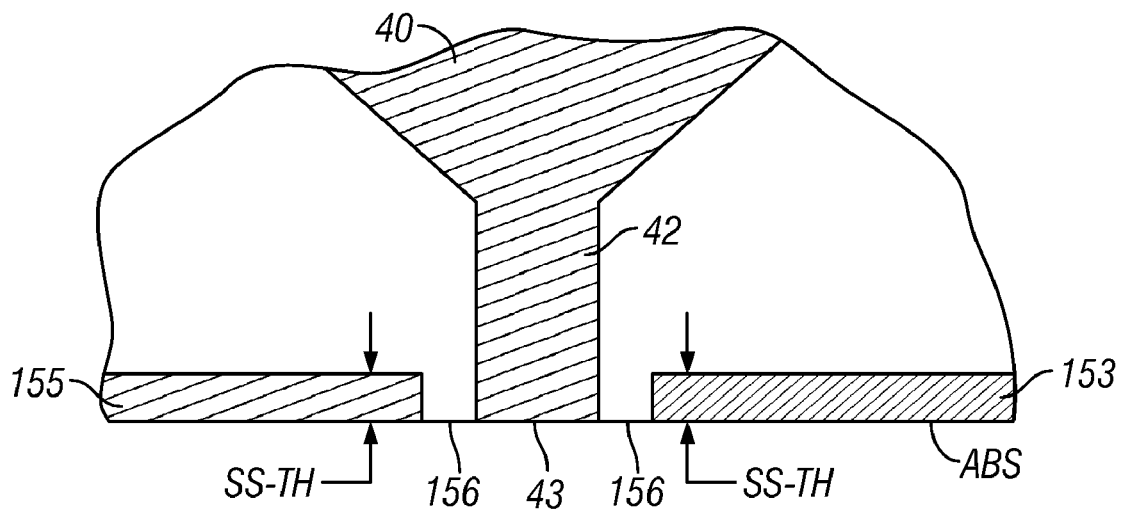

An important feature of the write head 130 are nonmagnetic separation layers 190, 191. Layer 190 magnetically separates LS 180 from side shields 153, 155 and layer 191 magnetically separates side shields 153, 155 from TS 150. Layers 190, 191 can be formed of any nonmagnetic material, such as $Al_2O_3$, Ru, Rh, Pt, Cr, Au or nonmagnetic alloys of these materials. The thickness of each of layers 190, 191 should be thick enough to assure there is no magnetic flux leakage from one shield into the adjacent shield. Typically this thickness would be in the range of about 20 nm to 200 nm. The TS 150, LS 180 and side shields 153, 155 are formed of soft magnetically permeable ferromagnetic material, such as alloys of NiFe, CoFe and NiFeCo that are typically formed by electroplating. The separation layers 190, 191 enable LS 180, TS 150 and side shields 153, 155 to be formed of different materials or different compositions of the same alloy, so that the magnetic permeability, and thus the magnetic flux density (magnetic field), through each of the shields can be independently controlled. This enables the magnetic field form WP 40 to be tailored to provide the desired magnetic field gradient. FIGS. 2C and 2D are views of sectional planes through sections 2C-2C and 2D-2D, respectively, of FIG. 2B and illustrate the WP tip 42 and LS 180, TS 150 and side shields 153, 155 at the ABS.

The TS 150 shield is used to improve the down-track write field gradient for better writing, while side shields 153, 155 are used to contain the side fields for writing width control and to eliminate adjacent-track erasure. From a design and performance point of view, it is desirable to have independent trailing and side shields. For the trailing shield, higher-moment material and a longer TH are important to achieve a good write field gradient. For the side shields, a shorter TH is more desirable to reduce flux shunting (which degrades writing field) and to enable smaller side-gap for better write-width control. Thus in the write head according to the present invention, the three shields separated by nonmagnetic layers 190, 191, and wherein each shield may have its own TH, allow independent leading, trailing, and side shields to be designed to optimize write performance.

Figure 3A:
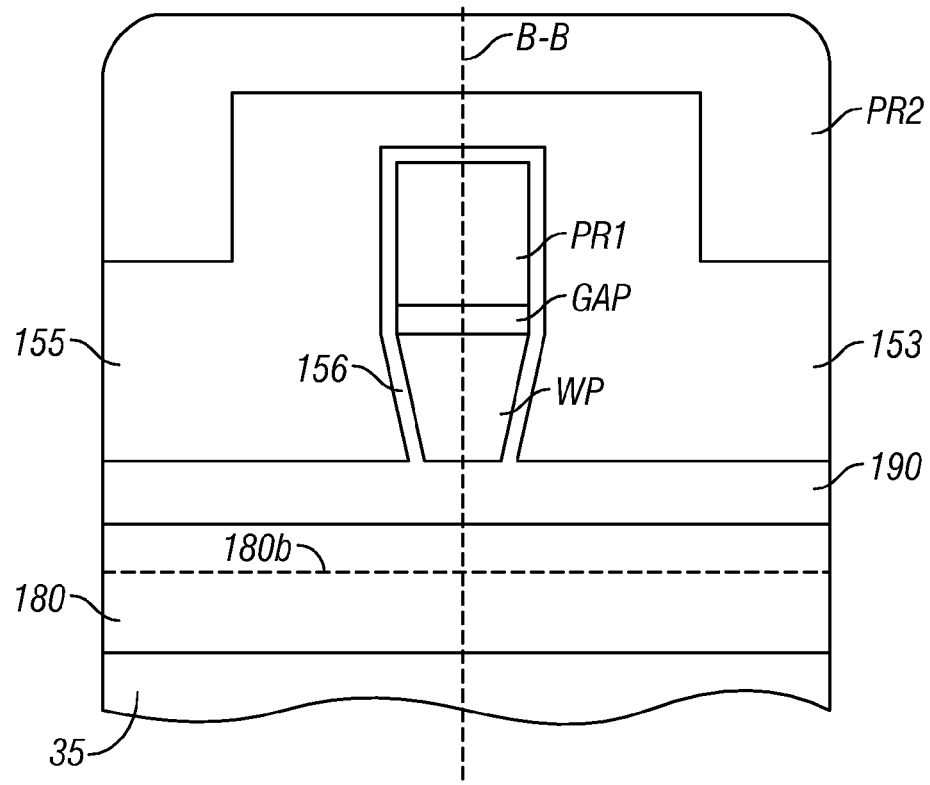
FIGS. 3A-3B illustrate the initial steps in the fabrication of the write head of this invention, with FIG. 3B being a sectional view of plane B-B in FIG. 3A.
Figure 3B:
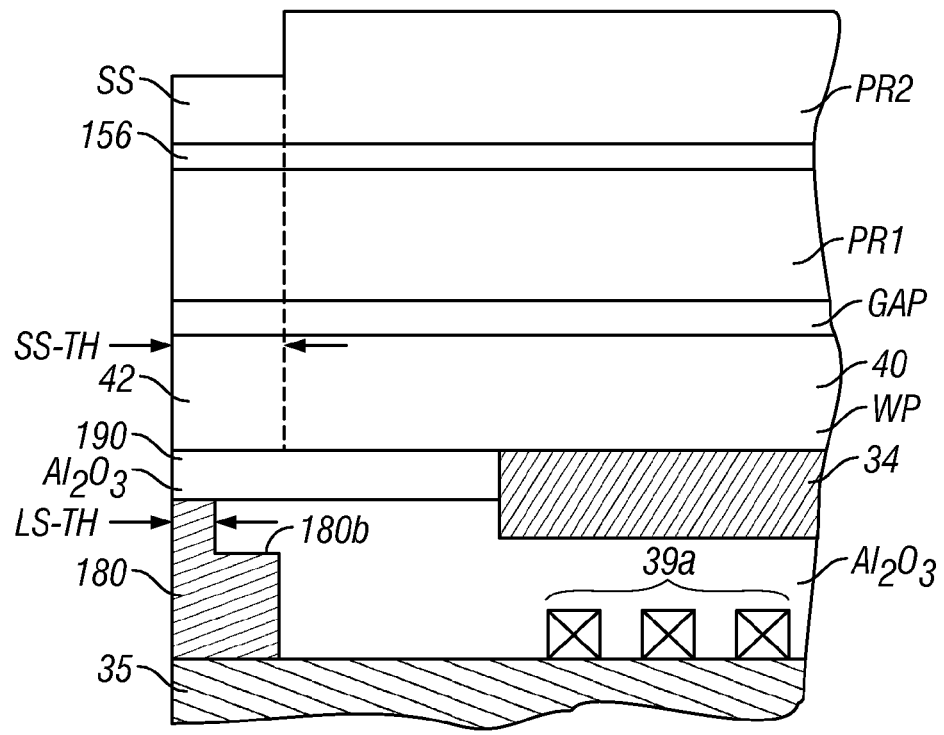

FIGS. 3A-3B illustrate the initial steps in the fabrication of the write head 130. FIG. 3B is a sectional view of plane B-B in FIG. 3A. The first flux return pole 35 is electroplated, then $Al_2O_3$ is refilled, and CMP is performed. Photolithography and further electroplating of the Cu coil 39a and the magnetically permeable material, such as NiFe, are performed. Then refilling with $Al_2O_3$ and CMP results in the formation of LS 180 on return pole 35. Photolithography and further electroplating of LS 180 step edge 180b defines LS-TH and main pole 34 and then $Al_2O_3$ refilling and CMP are performed to planarize the alumina, which becomes the nonmagnetic separation layer 190. Alternatively, $Al_2O_3$ deposition with liftoff may form the nonmagnetic separation layer 190.

To achieve the WP structure in FIG. 3A, a WP layer of magnetic material is deposited on layer 190 to a thickness corresponding to the desired thickness of the WP, typically in the range of about 50 to 300 nm. The WP layer is high-moment magnetic material, such as CoFe or NiFe, and is formed by sputtering or electroplating. A full film of alumina as the gap layer is deposited over the WP layer, typically by sputtering, and serves as a "thin alumina mask" (TAM) during subsequent ion milling to form the WP. Other materials that may serve as the gap layer include tantalum-oxide, silicon-oxide, silicon-nitride or diamond-like carbon. The gap layer is typically formed to a thickness in the range of about 20 nm to 60 nm and will serve as the gap layer 156 (FIG. 2A) between the WP end 43 and the TS 150. A first layer of organic photoresist (PR1) is deposited and patterned above the gap layer and underlying WP layer. The PR1 layer may be a photo-sensitive organic material provided it is not sensitive to radiation at the wavelengths used in other lithographic steps for forming the write head, or a photo-insensitive organic material like Durimide® 20-1.2 μm, a polyimide material available from Arch Chemicals, Inc. Reactive ion etching (RIE) and ion milling then remove portions of the layers not protected by the patterned PR1 layer. Next, a thin film of alumina is deposited by atomic layer deposition (ALD) over the structure to a thickness of about 40 to 200 nm to form gap layer 156 surrounding the structure. The ALD process is used because of its good conformal coverage over various topographies. Next an electrically conductive seed layer (not shown), such as Ru, Rh or a Au/Ta bilayer, is deposited over gap layer 156, to a thickness in the range of about 5 to 20 nm. A second photoresist layer PR2 is then patterned on the structure to define the area for subsequent electroplating of the magnetically permeable side shield material for side shields 153, 155. The side shield material is then electroplated onto the seed layer. The structure in FIG. 3A shows the WP spaced from the side shields 153, 155 by the nonmagnetic gap layer 156. The side shield TH (SS-TH) is defined by electroplating through this second photoresist PR2, as shown in FIG. 3B.

Figure 4A:
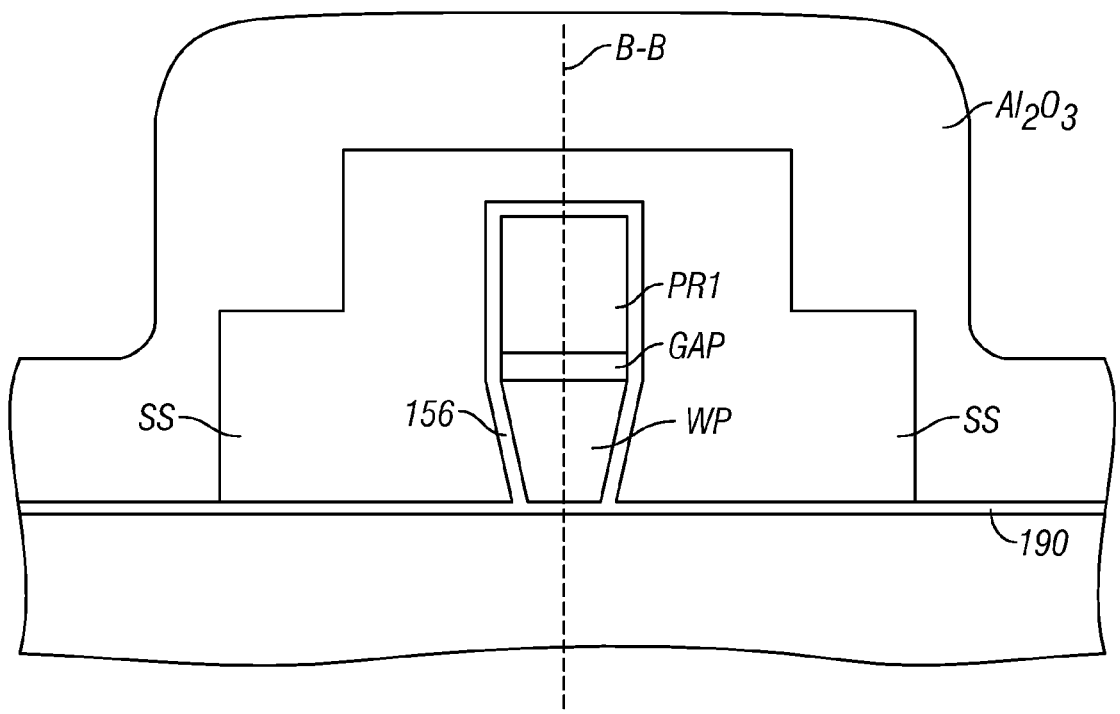
FIGS. 4A and 4B are views of the structure during a processing step in the fabrication of the write head shown in FIGS. 2A-2D.
Figure 4B:
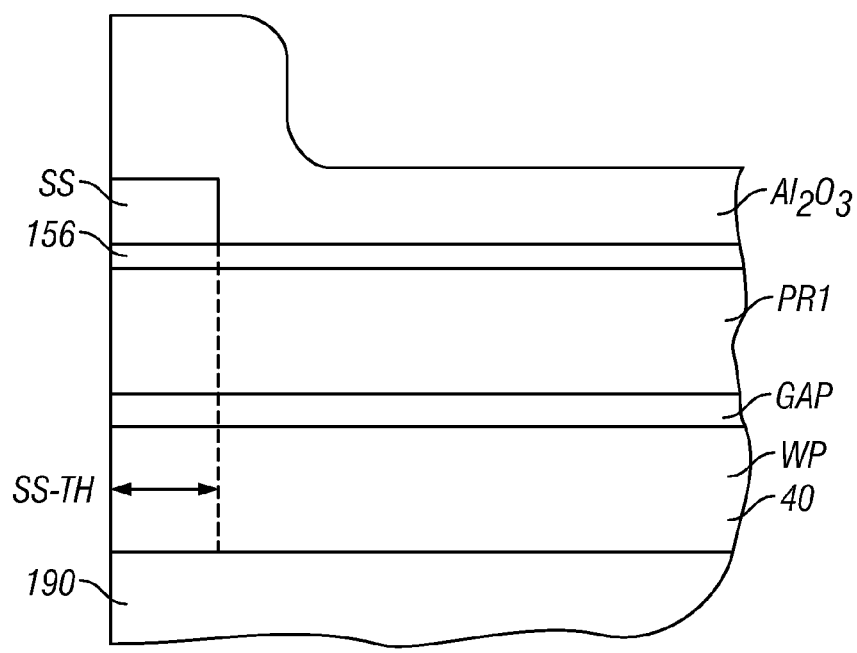
Figure 5A:
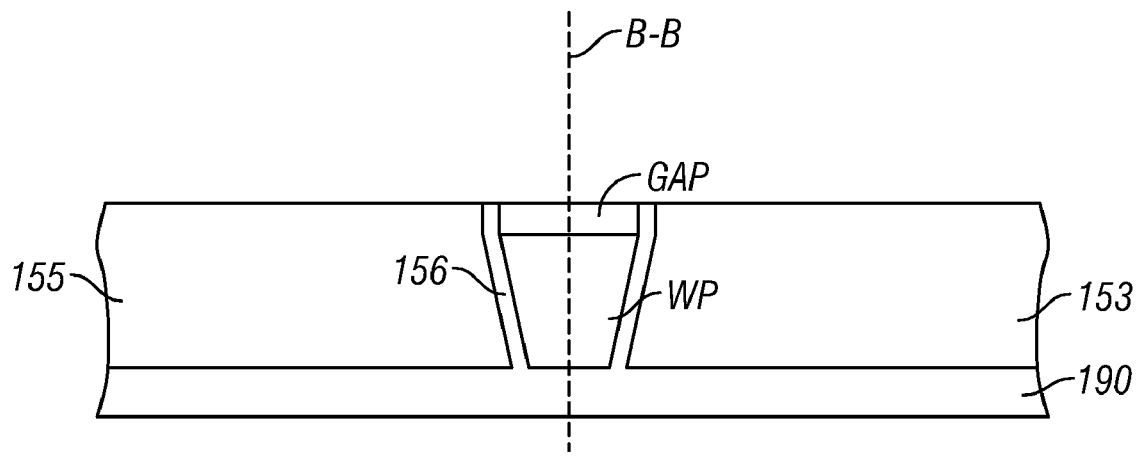
FIGS. 5A and 5B are views of the structure during a processing step in the fabrication of the write head shown in FIGS. 2A-2D.
Figure 5B:
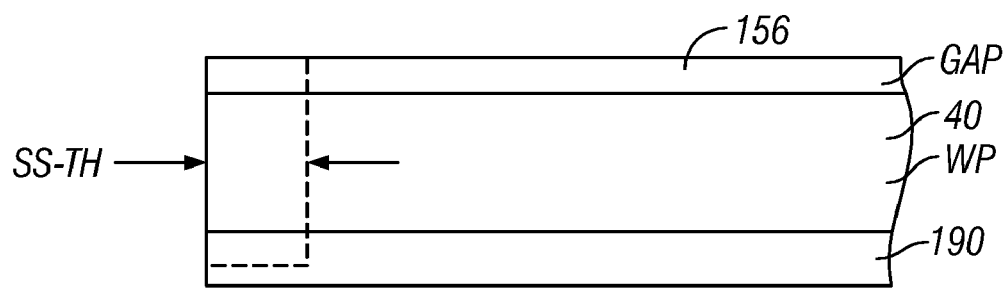

Next in FIG. 4A and FIG. 4B, a sectional view through plane B-B of FIG. 4A, the second photoresist layer PR2 is stripped and $Al_2O_3$ is refilled. Then, in FIG. 5A and FIG. 5B, a sectional view through plane B-B of FIG. 5A, the structure is planarized by CMP.

Figure 6A:
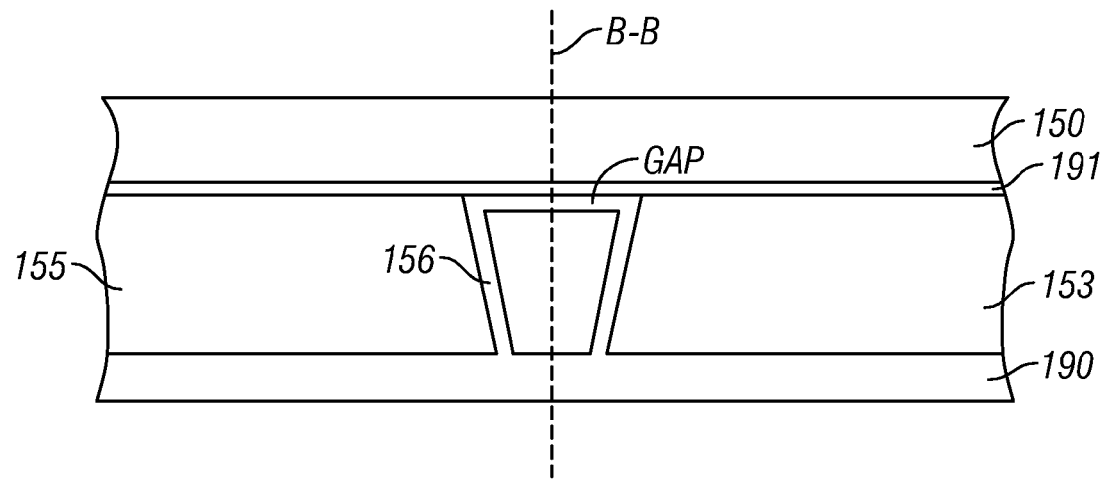
FIGS. 6A and 6B are views of the structure during a processing step in the fabrication of the write head shown in FIGS. 2A-2D.
Figure 6B:
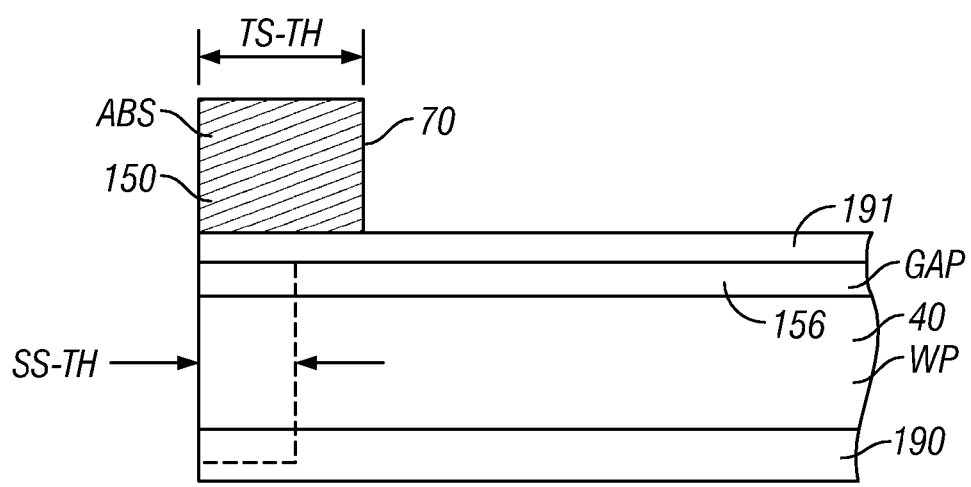

Next, in FIG. 6A and FIG. 6B, nonmagnetic layer 191 is deposited. Layer 191 also serves as part of the gap layer and may also serve as the seed layer for subsequent electroplating of the TS 150. The nonmagnetic layer 191 may be formed of any nonmagnetic material, but if it is to also function as the seed layer, then it should be a nonmagnetic metal, for example Rh, Ru, Pt, Cr, Au, or their alloys. Layer 191 may have a thickness of about 10 to 50 nm. A photoresist layer (not shown) is then patterned on the structure to define the area for subsequent electroplating of the magnetically permeable material for the TS 150. The TS material is then electroplated on the seed layer 191. The trailing shield throat height (TS-TH) is defined by electroplating through the photoresist, and is the distance between the ABS and back edge 70. Then the photoresist layer is stripped, leaving the TS 150, as shown in FIG. 6B While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions in data tracks of a magnetic recording layer comprising:
 a write pole having an end for facing the recording layer;
 a main pole connected to the write pole and having an end recessed from the write pole end;
 an electrically conductive coil wrapped around the main pole for generating magnetic flux in the main pole and its connected write pole;
 first and second return poles spaced on opposite sides of the write pole in the along-the-track direction;
 a trailing shield having an end generally coplanar with the write pole end and spaced from the write pole end in the along-the-track direction;
 a pair of side shields having ends generally coplanar with the write pole end and spaced on opposite sides from the write pole end in the cross-track direction; and
 a first layer of nonmagnetic material separating the trailing shield from the side shields.

2. The write head of claim 1 wherein the trailing shield is formed of a different material than the side shields.

3. The write head of claim 1 wherein the trailing shield and the side shields are formed of a ferromagnetic alloy of at least two elements selected from the group consisting of Co, Fe and Ni, and wherein the alloy composition of the trailing shield is different from the alloy composition of the side shields.

4. The write head of claim 1 wherein the trailing shield is connected to the second return pole.

5. The write head of claim 1 further comprising a leading shield having an end generally coplanar with the write pole end and spaced from the write pole end in the along-the-track direction, the leading shield being located on the opposite side of the write pole from the trailing shield in the along-the-track direction; and a second layer of nonmagnetic material separating the leading shield from the side shields.

6. The write head of claim 5 wherein the leading shield is formed of a different material than the side shields.

7. The write head of claim 5 wherein the leading shield and the side shields are formed of a ferromagnetic alloy of at least two elements selected from the group consisting of Co, Fe and Ni, and wherein the alloy composition of the leading shield is different from the alloy composition of the side shields.

8. The write head of claim 5 wherein the leading shield is connected to the first return pole.

9. The write head of claim 5 wherein the leading shield has a reduced thickness, measured perpendicular to its end, near the write pole end to define a leading shield throat height (LS-TH).

10. A magnetic recording disk drive perpendicular recording write head for magnetizing regions in data tracks of a magnetic recording layer on the disk, the head being formed on a slider having an air-bearing surface (ABS) for facing the recording layer and comprising:
 a main pole having an end recessed from the ABS;
 a write pole on the main pole and having an end having a cross-track width substantially at the ABS;
 an electrically conductive coil wrapped around the main pole for generating magnetic flux in the main pole and its connected write pole;
 first and second flux return poles spaced on opposite sides of the write pole in the along-the-track direction;
 a leading shield of magnetically permeable material and having an end substantially at the ABS and located between the write pole end and the first return pole and spaced from the write pole end in the along-the-track direction;
 a trailing shield of magnetically permeable material and having an end substantially at the ABS and located between the write pole end and the second return pole and spaced from the write pole end in the along-the-track direction;
 a pair of side shields of magnetically permeable material and having ends generally coplanar with the write pole end and spaced on opposite sides from the write pole end in the cross-track direction;
 a nonmagnetic gap layer located between the write pole and the leading, trailing and side shields;
 a first layer of nonmagnetic material separating the trailing shield from the side shields; and
 a second layer of nonmagnetic material separating the leading shield from the side shields.

11. The write head of claim 10 wherein one of said three shields consisting of leading, trailing and side shields is formed of a material different from the material of the other two shields.

12. The write head of claim 10 wherein the leading, trailing and side shields are formed of a ferromagnetic alloy of at least two elements selected from the group consisting of Co, Fe and Ni; and wherein the alloy composition of one of said three shields consisting of leading, trailing and side shields has an alloy composition different from the alloy composition of the other two shields.

13. The write head of claim 10 wherein the trailing shield has a thickness, measured perpendicular to its end, near the write pole end to define a trailing shield throat height (TS-TH); wherein each of the side shields has a thickness, measured perpendicular to its end, near the write pole end to define a side shield throat height (SS-TH); and wherein TS-TH is different from SS-TH.

14. The write head of claim 13 wherein the leading shield has a thickness, measured perpendicular to its end, near the write pole end to define a leading shield throat height (LS-TH); and wherein LS-TH is different from SS-TH.

15. The write head of claim 10 wherein the leading shield is connected to the first return pole.

16. The write head of claim 10 wherein the trailing shield is connected to the second return pole.

* * * * *